US008645692B2

(12) United States Patent  (10) Patent No.: US 8,645,692 B2
Yoshizawa et al.  (45) Date of Patent: Feb. 4, 2014

(54) SOURCE-OF-LEAKAGE DETECTABLE E-MAIL ADDRESS FORMING, SENDING AND DETECTION

(75) Inventors: Takeo Yoshizawa, Kanagawa-ken (JP); Jun Sakuma, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/570,384

(22) Filed: Aug. 9, 2012

(65) Prior Publication Data

US 2012/0303957 A1    Nov. 29, 2012

Related U.S. Application Data

(62) Division of application No. 11/318,751, filed on Dec. 27, 2005.

(30) Foreign Application Priority Data

Dec. 27, 2004 (JP) ................................ 2004-377398

(51) Int. Cl.
    *H04L 9/32* (2006.01)
(52) U.S. Cl.
    USPC ........................................................ 713/168
(58) Field of Classification Search
    USPC ........................................................ 713/168
    See application file for complete search history.

(56) References Cited

U.S. PATENT DOCUMENTS

| 7,139,825 | B2* | 11/2006 | Andaker et al. ............... 709/225 |
| 2004/0054887 | A1* | 3/2004 | Paulsen et al. ................ 713/154 |
| 2004/0201625 | A1 | 10/2004 | Karamchedu et al. | |

FOREIGN PATENT DOCUMENTS

| JP | 2002281088 | 9/2002 |
| JP | 2004056317 | 2/2004 |
| JP | 2004341830 | 2/2004 |

OTHER PUBLICATIONS

Guel, Mariko Suzuki, "Manner of sending e-mail-the way of writing e-mail without being humiliated"<Nikkei IT21, Japan, NikkeiBP, vol. 1, No. 6, pp. 17-42.

* cited by examiner

*Primary Examiner* — Edan Orgad
*Assistant Examiner* — Harris Wang
(74) *Attorney, Agent, or Firm* — Cantor Colburn LLP; Vazken Alexanian (57) ABSTRACT

Provides e-mail address forming methods to know with certainty whether or not an e-mail address was leaked. A method includes: sending a receiver's identifier and a sender's identifier to a receiver's mail server; computing a value which is encrypted by the mail server with a secret key, the secret key being only possessed by the mail server, from the receiver's identifier, the sender's identifier, and a nonce issued by the mail server, and sending the value to a receiver; and forming an e-mail address (LD address) to be used by a sender who sends a mail to a receiver, by attaching a receiver's domain name to the encrypted value. Furthermore, the present invention has an e-mail address sending method, and an e-mail sending system which uses the e-mail address forming method to know with certainty whether or not the user of an e-mail address leaked the e-mail address.

6 Claims, 8 Drawing Sheets

SOURCE-OF-LEAKAGE DETECTABLE E-MAIL ADDRESS FORMING, SENDING AND DETECTION

CROSS REFERENCE TO RELATED APPLICATIONS

This application is a divisional of U.S. application Ser. No. 11/318,751 filed on Dec. 27, 2005, which claims priority to Japanese Patent Application JP2004377398, with Japanese filing date of Dec. 27, 2004, and all the benefits accruing therefrom under 35 U.S.C. §119, the contents of which in its entirety are herein incorporated by reference.

BACKGROUND

The present invention relates to a source-of-leakage detectable e-mail address forming method, and particularly to a method of the sending and receiving of an e-mail according to which it is possible to detect a source of leakage of an e-mail using the source-of-leakage detectable e-mail address forming method, and a system using the same.

In recent years, the leakage of personal information has been an issue of public concern. Therefore, the protection of personal information has been clamored for. There are various measures for the protection of personal information, and the detection of a source of leakage has a deterrent effect on personal information flow. The leakage of an e-mail address is considered to be caused by wiretapping on a communication channel. To counter this, the encryption of a communication channel such as SSL has been utilized. On the other hand, there is a possibility that one who has obtained an address leaks it artificially (data creep). In this case, it is not possible to prevent a leakage by use of an existing security system such as the encryption of a communication channel. As one of methods of detecting a source of information leakage, E-mail Dyeing is known.

E-mail Dyeing is a system in which a source of e-mail address leakage can be detected due to the enhancement of a conventional mail system. It is assumed that the e-mail address of a user A who uses a mail server of receiver.com is A@receiver.com, the e-mail address of a user B who uses a mail server of sender.com is B@sender.com, and the e-mail address of a user C who uses a mail server of sender2.com is C@sender2.com. When A and B make contact, the following addresses are used.

| A to B | B@sender.com |
| B to A | AB@receiver.com |

Similarly, when A makes contact with C,

| A to C | C@sender2.com |
| C to A | AC@receiver.com |

The address used when B or C sends an e-mail to A is called a dyed e-mail address. However, A himself/herself is not required to manage the dyed e-mail address such as AB@receiver.com, and A's mail server of receiver.com carries out communications by use of a conversion table of the following addresses and the dyed addresses according to a communications contact.

TABLE 1

| Dyed e-mail address | Original e-mail address | Communications contact |
| --- | --- | --- |
| AB@receiver.com | A@receiver.com | B |
| AC@receiver.com | A@receiver.com | C |

When A sends an e-mail, a "From:" field is converted according to his/her communications contact, thus concealing A's real address. When A receives an e-mail, an address in a "To:" field is converted into its original address by use of the conversion table. At this time, if an e-mail is delivered to AC@receiver.com from an unknown address (for example, except C), it is possible to detect the fact that C leaked AC@receiver.com.

However, if an e-mail address is leaked on a communication channel while an e-mail is sent by use of E-mail Dyeing, it is not necessarily limited that the user B who uses the dyed address leaked the e-mail address. Furthermore, with E-mail Dyeing, in the mail server, when there are N e-mail addresses and each e-mail address carries out communications with M addresses on average, heap usage which is required for the conversion table of destination addresses and dyed e-mail addresses is O (NM). Moreover, a lookup is required to be performed on a table of N×M to convert a dyed e-mail address and a sender. Additionally, E-mail Dyeing can be realized only in a case where at least A knows B, and there is no protocol to find A's e-mail address from B's side who does not know A. Hence, for a contact made from B's side, an e-mail address of an existing mail system is needed to be used. Thus, it is not possible for A to authenticate communications selectively.

BRIEF SUMMARY

Therefore, to overcome these problems the present invention is to provide an e-mail address forming method to know with certainty whether or not an e-mail address was leaked.

The invention is also to provide an e-mail sending system which uses the e-mail address forming method to know with certainty whether or not the user of an e-mail address leaked the e-mail address.

The invention is also to provide when the leakage was caused by the user of an e-mail address, an e-mail address forming method in which it is possible to detect who the user is, that is, a source of leakage; or a system using the method.

The invention is further to provide a method of sending and receiving an e-mail with extremely small computation resources which are used to detect a source of leakage; or a system using the method.

The invention is further to provide a method of sending and receiving an e-mail or a mail system, which is capable of exchanging symmetric e-mail addresses with which it is possible to mutually request communications with the pursuit of responsibility for the leakage of an e-mail address.

The invention is still further to provide a method of sending and receiving an e-mail; or an e-mail sending system, which has compatibility with an existing mail system as well as being able to detect a source of leakage.

BRIEF DESCRIPTION OF THE SEVERAL VIEWS OF THE DRAWINGS

For a more complete understanding of the present invention and the advantage thereof, reference is now made to the following description taken in conjunction with the accompanying drawings, in which.

DETAILED DESCRIPTION

The present invention provides an e-mail address forming method to know with certainty whether or not an e-mail address was leaked. The invention also provides an e-mail sending system which uses the e-mail address forming method to know with certainty whether or not the user of an e-mail address leaked the e-mail address. The present invention also provides a solution to determining when leakage was caused by a user of an e-mail address, and provides an e-mail address forming method in which it is possible to detect who the user is, that is, a source of leakage; and provides a system using the method. The present invention also provides a method of sending and receiving an e-mail with extremely small computation resources which are used to detect a source of leakage; and provides a system using the method.

The present invention also provides a method of sending and receiving an e-mail; or a mail system, which is capable of exchanging symmetric e-mail addresses with which it is possible to mutually request communications with the pursuit of responsibility for the leakage of an e-mail address. The present invention also provides a method of sending and receiving an e-mail; or an e-mail sending system, which has compatibility with an existing mail system as well as being able to detect a source of leakage.

In an embodiment, the present invention provides an e-mail address forming method including the steps of: sending a receiver's identifier A and a sender's identifier B to a receiver's mail server AMS; computing a value {A, B, N}K which is encrypted by the mail server AMS with a secret key K, the secret key being possessed by the mail server AMS alone, from the receiver's identifier A, the sender's identifier B, and a nonce N issued by the mail server AMS, and sending the value {A, B, N}K to a receiver; and forming an e-mail address (an LD address) to be used by a sender who sends an e-mail to the receiver, by attaching a receiver's domain name to the encrypted value {A, B, N}K.

Moreover, an embodiment of the present invention provides an e-mail address sending method including the steps of: sending a receiver's identifier A and a sender's identifier B to a receiver's mail server AMS; computing a value {A, B, N}K which is encrypted by the mail server AMS with a secret key K, the secret key being possessed by the mail server AMS alone, from the receiver's identifier A, the sender's identifier B, and a nonce N issued by the mail server AMS, and sending the value {A, B, N}K to a receiver A; forming an e-mail address (an LD address) to be used by a sender who sends an e-mail to the receiver, by attaching a receiver's domain name to the encrypted value {A, B, N}K; and sending the formed e-mail address to the sender.

Furthermore, an embodiment of the present invention provides an e-mail sending method including the steps of: disclosing a receiver's public address; sending the public address and a message MB for requesting a permission of communications with the sender to the receiver's mail server AMS via a sender's mail server BMS; causing the mail server AMS to send MB to the receiver; causing the mail server AMS to receive an address issuance permission from the receiver who read the message; computing the value {A, B, N}K which is encrypted by the mail server AMS with the secret key K of the mail server AMS from the receiver's identifier A, the sender's identifier B and the nonce N issued by the mail server AMS, thus sending the value {A, B, N}K to the sender via the mail server BMS; and forming the e-mail address (the LD address) by attaching the receiver's domain name to the encrypted value {A, B, N}K, thus sending the e-mail to the receiver.

Hereinafter, descriptions will be given of the present invention by example through particular embodiments. However, the following embodiments do not limit the present invention covered in the scope of claims, and also all of combinations described in the characteristics of the embodiments are not necessarily essential for solving means of the present invention.

DEFINITION

First, terms will be defined as follows. In addition, it is assumed that all communication channels used in the present invention are encrypted in some way and that a third person can not wiretap on the communication channels.

Communications contacts A, B (A is a receiver and B is a sender in each drawing)

Mail server used by A AMS (a domain name of receiver.com)

Mail server used by B BMS (a domain name of sender.com)

A's e-mail address A@receiver.com

B's e-mail address B@sender.com

Secret key of a secret-key cryptography of AMS KAM

Nonce N issued by AMS (a nonce indicates a value to be used only once for the same purpose.)

Public key of public-key cryptography of AMS KAMP

Public key of public-key cryptography of B BP

"To:" field means a destination address field.

"From:" field means a sender's field.

Address Forming Method

An e-mail address used when the sender B sends an e-mail to the receiver A is assumed to be {A, B, N}KAM@receiver.com. A and B, which are used here in the address, are identifiers of A and B, respectively. Note that {*}K, which is parenthesized, means that "*" is encrypted with a key K. Hereinafter, an e-mail address formed as described above is referred to as a Leakage Detectable e-mail address. If, here, only user names of A and B are used and an LD address is formed to be {A, B}KAM@receiver.com, there are high risks to be decrypted. Therefore, a nonce is used to increase the redundancy of an encrypted message. If an e-mail is sent from someone other than B by use of this e-mail address, AMS (or A) can detect the fact that B leaked the e-mail address, since the address itself includes information on B. Moreover, a mail system of the present invention using the Leakage Detectable e-mail address of the present invention (hereinafter referred to as the LD address) is abbreviated to LDMS. Incidentally, a special value used only once, for example, for the date and time of the moment (a timestamp) or some purpose is used for a nonce.

Example of Forming an LD Address

An encryption method to be used for the present invention can be selected from various methods without departing from spirit and scope of the present invention. A case of encryption by use of RSA, in which prime numbers, p=1231 and q=4567, are used in a public-key cryptography, is cited as an example. In the addresses of 10@receiver.com, 11@sender.com and 12@sender.com, LD addresses whose receiver is assumed to be 10@receiver.com are as follows:

4011665@receiver.com based on {1011}_RSA=4011665 (an address which 10 receives from 11)

5595442@receiver.com based on {1012}_RSA=5595442 (an address which 10 receives from 12)

Here, {*}_RSA means encryption by use of the public-key cipher based on the prime numbers, p and q. In terms of address formation with a simple rule, such as 1011@receiver.com and 1012@receiver.com which are used for E-mail Dyeing, a conversion rule of an address is extremely easy to be discovered. When an LD address is formed with encryption, it is difficult to find out the conversion rule due to the amount of computation. An e-mail address forming system may also be set by realizing the above address forming method in hardware.

Address Issuance Protocol

In the current mail system, it is necessary for B to know A's e-mail address to send an e-mail to A. The present invention similarly requires that B knows A's LD address to send A an e-mail. However, to achieve an object of the present invention (the detection of the source of leakage), an LD address can not be disclosed to an arbitrary person. Therefore, described here is a method of disclosing the LD address only to a specific person (a person who is authenticated by A). Moreover, in the current mail system, it is possible to operate the system by notifying the specific person alone of the e-mail address, while it is also possible to operate the system by disclosing the address to an indefinite number of persons. An LD address issuance method of the present invention is designed for both operation in order not to undermine the convenience of the current mail system (although the latter is the case where the address is disclosed to an indefinite number of persons, a person to whom the LD address is disclosed is selected from the indefinite number of persons). The e-mail address issuance method of the present invention allows one to select a person to whom A passes the LD address. In other words, a process in which A authenticates B (the person to whom the address is passed) in some form is required. Here, descriptions will be given of two cases including a case where A directly authenticates B and a case where the authentication is performed by a request from B to A.

Case where A Directly Authenticates B

Figure 1:
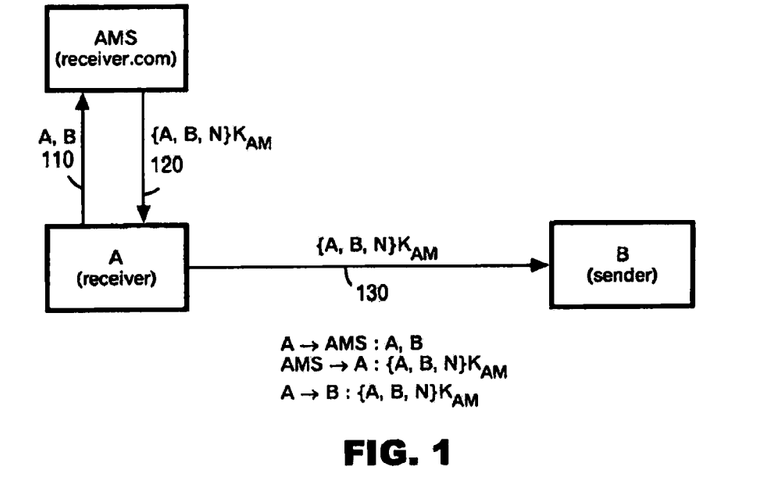
FIG. 1 is a diagram showing an address issuance protocol in a case where an address is issued from A.

FIG. 1 shows an address issuance protocol in a case where A issues an address. A's identifier (such as the account name of an e-mail address) is set to be A, and B's identifier is set to be B. First, A sends A and B to AMS (110). Next, AMS, which received it, forms an LD address, ({A, B, N}$K_{AM}$), and then the formed address is returned to A (120). FIG. 1 shows a method in which A tells B the LD address by use of a method other than an e-mail (130). However, it may also be set that AMS notifies the LD address directly to B. At this time, communications between A and AMS and between A and B are assumed to be securely performed by using methods such as encryption.

Case 1 where Authentication is Performed by R Request from B to A

Figure 2:
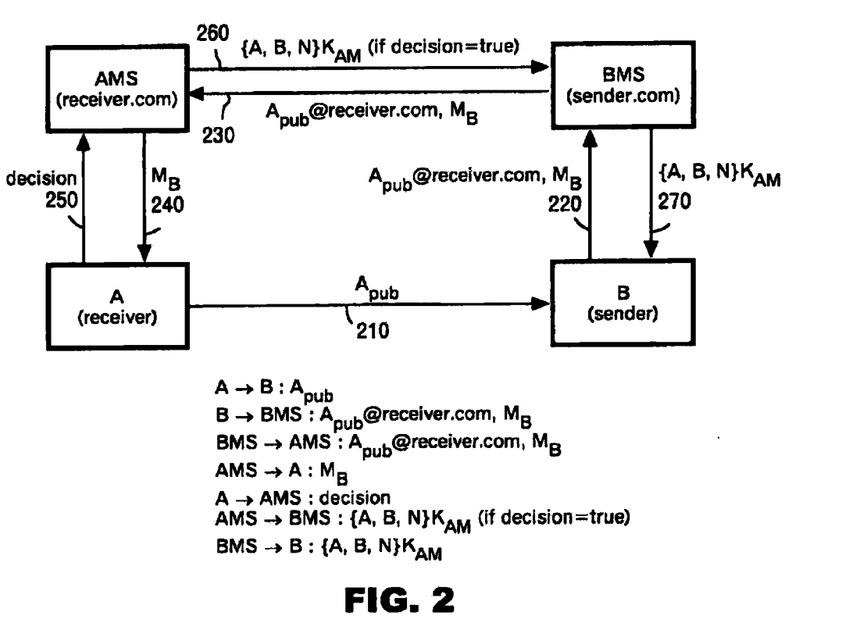
FIG. 2 is a diagram showing an address issuance protocol in a case where BMS is reliable.

FIG. 2 shows an address issuance protocol in a case where BMS is reliable. In the case of the issuance protocol shown in FIG. 1, it is necessary for A to know B in advance. Therefore, there are no approach methods on B's side. When A does not know B, the method of requesting A for B's own authentication from B's side is required. FIG. 2 shows the issuance protocol to solve this problem. First, A discloses $A_{PUB}$@receiver.com (this is referred to as the public LD address) (210). Next, B sends a message $M_B$ to request the disclosed $A._{PUB}$@receiver.com for a permission of communications with B (the message is sent to AMS through BMS in the drawing) (220). Then, AMS, which received this message, passes $M_B$ to A (240). Thereafter, A sends to AMS an issuance permission (decision) of an LD address after judging the contents of MB (250). Then, when the decision is permitted (true), the LD address ({A, B, N}$K_{AM}$) is sent to B (260, 270). Lastly, B sends A an e-mail by using the LD address, ({A, B, N}$K_{AM}$@receiver.com), from this time onward. At this time, each communication is assumed to be securely performed by use of methods such as encryption.

Case 2 where Authentication is Performed by A Request from B to A

Figure 3:
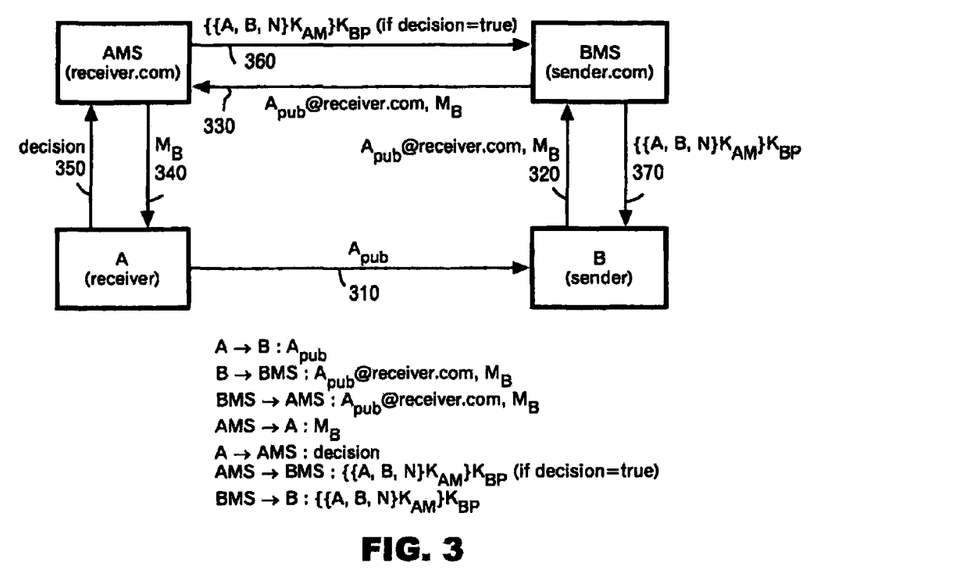
FIG. 3 is a diagram showing an address issuance protocol in a case where BMS is not reliable.

FIG. 3 shows an address issuance protocol in the case where BMS is not reliable. In the protocol in FIG. 2, since BMS can know the LD address, ({A, B, N}$K_{AM}$), when the LD address is leaked, it becomes impossible to detect whether the source of leakage of the LD address is BMS or B under the circumstance where BMS is not reliable. When BMS exists in the same region of responsibility as B (for example, when both B and BMS are under the control of a company B'.), there arises no problem. However, when the responsibility regions of BMS and B are different from each other, for example, when BMS is operated by an Internet service provider (ISP) and B is a user thereof, it is required to detect which the source of leakage is. FIG. 3 shows a solution to this problem. Although 310 to 350 in FIG. 3 are the same as 210 to 250 in FIG. 2, the LD address is notified after being encrypted with the public key ($K_{BP}$) of B when AMS notifies BMS of the LD address (360). Thus, it is possible to notify B of the LD address (370) without making BMS know the main body of the LD address.

Protocol for Sending and Receiving an E-Mail

The LD address for A, {A, B, N}$K_{AM}$@receiver.com, is assumed to be securely sent to the sender B in accordance with the foregoing address issuance protocol. In addition, here, there is a prerequisite that A's mail server AMS does not leak to a third person the LD address, {A, B, N}$K_{AM}$@receiver.com, and the secret key $K_{AM}$ of A.

Case where BMS is Reliable

Figure 4:
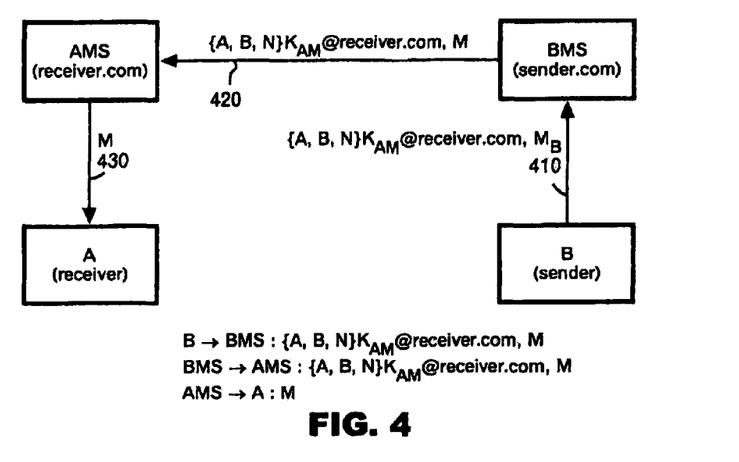
FIG. 4 is a diagram showing an e-mail sending protocol from B to A in a case where BMS is reliable.

The case where BMS is reliable indicates a case where there is no risk of leakage of {A, B, N}$K_{AM}$@receiver.com from BMS to the third person. FIG. 4 shows a protocol for sending an e-mail from B to A. First, B sends a message M to BMS by use of the address, {A, B, N}$K_{AM}$@receiver.com (410). Next, BMS sends the message M to AMS by use of the address, {A, B, N}$K._{AM}$@receiver.com (420). Lastly, AMS sends the message M to A after AMS finds A out based on (A, B, N}$K_{AM}$ by use of the secret key $K_{AM}$ of the secret key cipher (430). In this protocol, there is a prerequisite that BMS and AMS do not leak {A, B, N}K$_{AM}$@receiver.com. Hence, B alone has a possibility to leak the address. When B leaks {A, B, N}K$_{AM}$@receiver.com and an e-mail is sent by use of {A, B, N}K$_{AM}$@receiver.com, A can detect the source of leakage of A's own LD address since AMS decrypts the address to find B, as long as each sender is provided with an LD address different from each other.

Case where BMS is not Reliable

Figure 5:
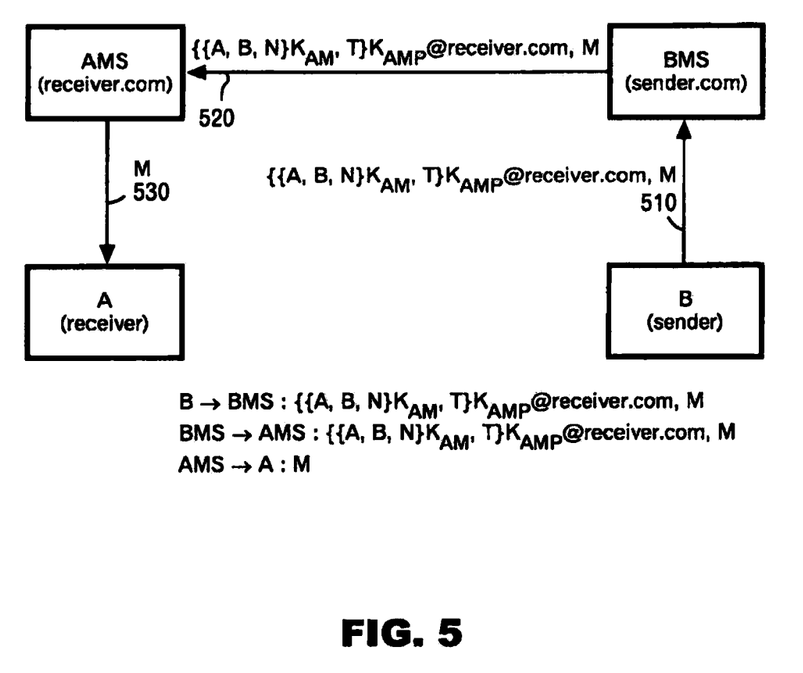
FIG. 5 is a diagram showing an e-mail sending protocol in a case where BMS is not reliable.

FIG. 5 shows an e-mail sending protocol in the case where BMS is not reliable. First, B forms an encrypted LD address, {{A, B, N}K@yAM@z, T}K@yAMP@z@receiver.com, by use of a public key K@yAMP@z and a timestamp T, and sends the message M to BMS by use of the address, {{A, B, N}K@yAM@z, T}K@yAMP@z@receiver.com (510). The address thus formed is referred to as an encrypted LD address. Next, BMS sends the message M to AMS by use of the address, {{A, B, N}K@yAM@z, T}K@yAMP@z@receiver.com (520). Lastly, AMS sends the message M to A (530) after AMS finds A out based on {{A, B, N}K@yAM@z, T}K@yAMP@z@receiver.com by use of a public key K@yAMP@z of AMS, a secret key K@yAM@z of a secret key cipher and a secret key K@yAMS@z of a public key cipher. Note that when the timestamp T is earlier than a time in which a validity period L is subtracted from the current time (that is, the timestamp is old), AMS does not send the message M to A. Otherwise, AMS notifies A that the timestamp is old. In this protocol, there is a prerequisite that AMS does not leak {A, B, N}K@yAM@z@receiver.com. Therefore, B and BMS alone have a possibility to leak the e-mail address. At this time, although B knows the LD address, {A, B, N}K@yAMP@z@receiver.com, BMS does not know it. BMS can know the encrypted LD address, {{A, B, N}K@yAMP@z, T}K@yAMP@z@receiver.com alone. Hence, the following can be said with regard to the detection of the source of leakage. A person who can form the encrypted LD address, {{A, B, N}K@yAM@z, T}K@yAMP@z@receiver.com, by use of a fresh timestamp T is only a person who knows (A, B, N}K@yAM@z. Hence, when an e-mail is sent from the third person through the encrypted LD address including a fresh timestamp, B can be detected as the source of leakage. Conversely, when an e-mail is sent from the third person through the encrypted LD address including an old timestamp, the source of leakage can not be detected uniquely. This is because a distinction is impossible to be made between a case where B leaks the LD address and the source of leakage forms the encrypted LD address by using an old timestamp to send an e-mail to A and a case where BMS leaks the encrypted LD address and the source of leakage sends A an e-mail by use of the leaked address. In this case, AMS can deal with the case by not sending A such an e-mail (an e-mail with an old timestamp) or by indicating A that there is a possibility of leakage. Note that in the case where BMS is reliable, forming the encrypted LD address {{A, B, N}K@yAM@z, T}K@yAMP@z@receiver.com by using the timestamp T is, needless to say, also effective.

Figure 6:
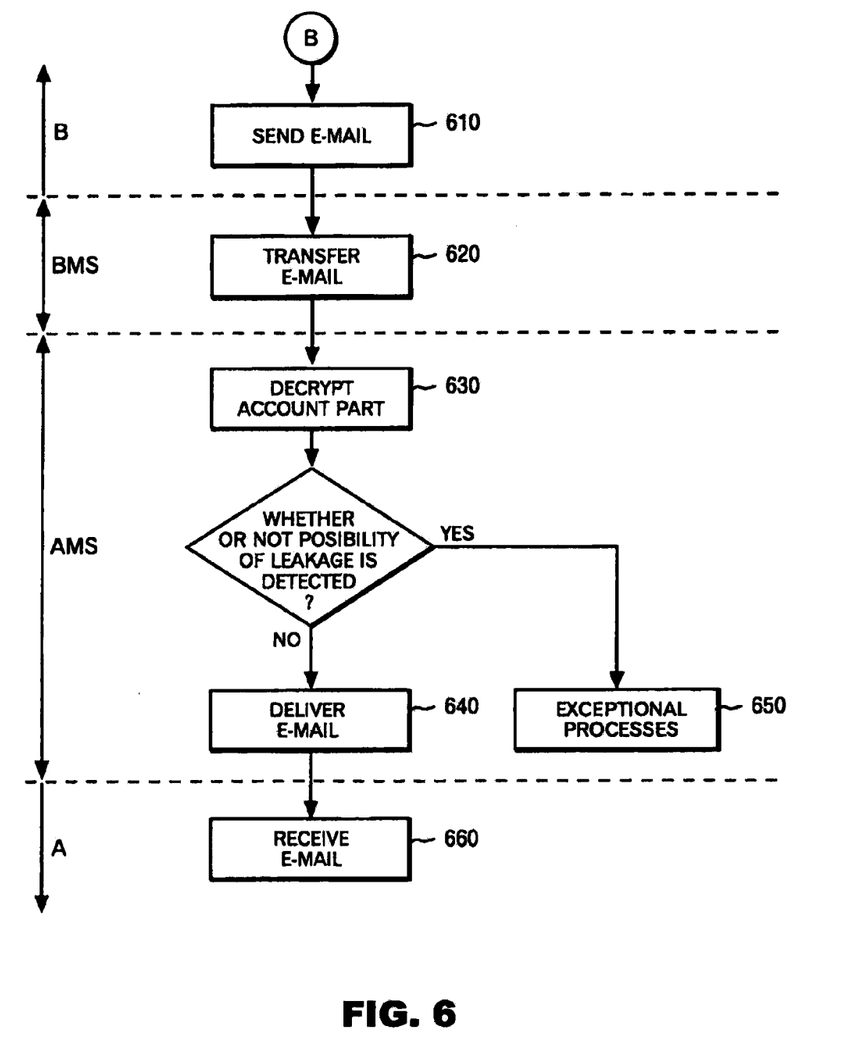
FIG. 6 is a diagram showing a flow chart of a case where B sends A an e-mail when BMS is reliable.

FIG. 6 shows a flow chart of a case where B sends A an e-mail (when BMS is reliable). First, in Step 610, B sends an e-mail to the address received from A, {A, B, N}k@receiver.com. Next, BMS, which received the e-mail from B to A, sends the e-mail to AMS (its domain name is receiver.com) in Step 620. Then, in Step 630, AMS, which received the e-mail, decrypts an account part, {A, B, N}k with a key k of AMS, and finds out A and B. Unless a possibility of the leakage of the e-mail address is detected by, for example, comparing a "From" field in the e-mail with B found by the decoding of the account part and then both are found to be coincident with each other, AMS sends A the e-mail in Step 640 and A receives the e-mail in Step 660. On the other hand, in cases such as a case where the "From" field in the e-mail does not coincide with B found by the decoding of the account part as a result of comparison and the possibility of the leakage of the e-mail address is detected, exceptional processes are performed in Step 650. These exceptional processes are to take measures such as not sending A the e-mail by judging it as an e-mail from the third person based on the leaked address, sending A the e-mail together with a warning notification or disabling A's e-mail address.

Hereinafter, described are embodiments in which the issuance of an LD address, the sending and receiving of e-mails by use of the LD address and an LDMS of the present invention are practically applied.

First Embodiment

Issuance of LD Address

If A issues an e-mail address physically directly to B, A first asks B's e-mail address when A tells his/her own contact point to B. Next, this B's e-mail address is sent to AMS (via mobile phone e-mail or the like) (110). A formed LD address is returned from AMS (to the mobile phone e-mail or the like) (120). Lastly, A tells this LD address directly to B (130).

If A tells B about his/her contact point via e-mail, B's e-mail address is first sent to AMS (110) when A tells his/her contact point to B. AMS forms an LD address and sends A the LD address via e-mail (120). Lastly, A sends the LD address via e-mail (at this time, this e-mail is encrypted) (130).

When a public LD address is open to the public on A's own website, A first discloses APUB@receiver.com as a public LD address on his/her own website (210 or 310). B, who saw it, sends to APUB@receiver.com a message MB to the effect that B requests A for an LD address (220 and 230, or 320 and 330). AMS sends MB to A (240 or 340). Next, A judges whether or not to provide B with the LD address based on MB, and sends AMS the result of the judgment regarding the issuance of the LD address (250 or 350). Lastly, AMS sends the LD address to B via e-mail as well as a message to the effect that this address shall not be leaked (260 and 270, or 360 and 370).

If A tells his/her contact point directly to B, A writes APUB@receiver.com on his/her own business card, and then provides it to B (210 or 310). Next, B sends an e-mail to APUB@receiver.com once (220 and 230, or 320 and 330). The remaining steps are the same as the foregoing implementation of disclosure on the website.

Second Embodiment

Sending and Receiving E-Mail by use of LD Address (1) When BMS is reliable, B types an LD address in a "To" field, thus sending an e-mail (410 and 420). AMS compares B found by decoding the LD address with a value in a "From" field of the e-mail. When they coincide with each other, AMS judges the e-mail to be an e-mail which was sent from an authorized sender, thus sending the message body of the e-mail to A (430). If B and the value of the "From" field do not coincide with each other, AMS notifies A of the detection of the leakage of the e-mail address. In this case, restrictions are imposed on B included in the LD address. Moreover, if a third person C types B in a "From" field, thus sending the e-mail, AMS can not detect the leakage of the address. However, from the contents of the message, it may be possible for A to judge the leakage.

(2) When BMS is reliable, B types the LD address in the "To" field, thus sending the e-mail (410 and 420). AMS decrypts the LD address, and sends B included in the LD address, the message and the contents of "From" field, to A (430). A, who received them, confirms from an identifier B, the "From" field, the contents of the message and the like that this e-mail address is not leaked. Given that it is the e-mail from the third person C, it means that B expressed as the identifier B leaked the e-mail address. In this case, no restriction is imposed on the identifier B included in the LD address. It is sufficient as long as A can judges from the contents.

(3) When BMS is not reliable, B types the LD address in the "To" field and click a "Send" button. At the same time, a mailer obtains a public key KAMP from AMS to form an encrypted LD address with the current time as a timestamp. The "To" field is rewritten into this encrypted LD address, thus sending the e-mail to BMS (510). BMS sends AMS the e-mail by use of the encrypted LD address (520). AMS, which received the e-mail, decrypts the encrypted LD address, and checks the timestamp.

(3-1) If the timestamp is later than a time in which a validity period L is subtracted from the current time (that is, the timestamp is fresh), the LD address is decrypted and is checked from the identifier B whether or not there is the leakage of the LD address. This check is performed by use of the check method of either above (1) or (2).

(3-2) If the timestamp is earlier than a time in which the validity period L is subtracted from the current time (that is, the timestamp is invalid), the validity period for this address is over and B is notified through BMS that the message was not delivered to A.

(4) When BMS is not reliable, the same processes are performed till (3-1) in the case of above (3). In the case of above (3-2) where the timestamp is invalid, the decodings of the encrypted LD address and the LD address are performed, thus checking the leakage of the LD address. This check is performed by use of the check method of either above (1) or (2). Finally, AMS notifies A that there is a possibility of the leakage of the encrypted LD address since the timestamp is invalid.

Third Embodiment

Measures Against "From" Forgery

In the current mail system, it is possible to make a "From" field a character string which is different from an e-mail address of the actual sender. By using a mail system of the present invention, it is possible to automatically block an e-mail whose "From" field is rewritten, or to issue a warning against it. The following is the procedure for it. First, an identifier of B (an e-mail sender), which is required to form an LD address, is set to be B's e-mail address (B@sender.com). That is, the LD address to be formed at this point is set to be {A, B, N}k@receiver.com. When A (an e-mail receiver) or AMS decrypts the LD address of the e-mail which was sent, the "From" field in the sent e-mail and B's identifier (B@sender.com) in the LD address are compared. If they are different from each other, the receipt is rejected or a warning is issued. In this way, for example, when B is infected with a virus and the virus sends an e-mail to A's (LD) address in B's address book by fabricating a "From" field, A can avoid receiving this kind of e-mail. Furthermore, by issuing a warning instead of rejecting the receipt, it is also possible that a user himself/herself judges whether or not it is "From" forgery.

Fourth Embodiment

Use of LD Address with Mobile Phone E-Mail

In an e-mail exchange via mobile phone, various spam e-mails have become problems now. One of them is a case where a spam e-mail is sent to a mobile phone e-mail address which was leaked. In this case, a mobile phone e-mail address is converted into an LD address with a protocol of the present invention. Therefore, it is possible to detect the source of leakage just in case the address is leaked and a spam e-mail is delivered. Moreover, it is possible to reject the receipt of spam e-mails by setting this address to reject e-mails without notifying other senders of the change in address. Another case is a case where the leakage destination of an e-mail address misrepresents a sender by use of a leaked e-mail address when sending a spam e-mail to an arbitrary third person. For example, his/her own e-mail address is set to be 10@receiver.com, the leakage destination is set to be 11@sender.com and an address to which the leakage destination sends a spam e-mail is set to be 12@abc.com, 13@abc.com and the like. At this time, the sender of the spam e-mail at the leakage destination misuses the sender's address, for example, To: 12@abc.com
From: 10@receiver.com.

Thus, 11@sender.com is concealed and the leakage destination provides a false identity as if the sender were 10@receiver.com. At this time, if 12@abc.com is an e-mail address which does not exist, this spam e-mail becomes an address unknown e-mail. Therefore, 10@receiver.com receives from a mail server a message that this spam e-mail was not delivered. At this point, if 10@receiver.com uses an LD address of 4011665@receiver.com formed based on {1011}_RSA=4011665, the destination of address leakage is detected as 11@sender.com. Although it is not possible to detect whether 11@sender.com is the spam e-mail sender or is merely the person who leaked the address, it is at least possible to detect that generation of the spam e-mail was caused by the leakage by 1@sender.com. Furthermore, there is an advantage to prevent a receiver from receiving a returned message of an address unknown e-mail by rejecting the receipt of an e-mail whose "From" field is 4011665@receiver.com.

Fifth Embodiment

Leakage Detection Service for E-Mail Address by ISP

If an Internet service provider (ISP), which provides an e-mail service, adopts an LDMS in its mail system, it is possible to provide its users with a service to notify the detection of the leakage of the e-mail addresses. The following is its method. Here, a mail server of the ISP is assumed to possess a secret key K specific to the server.

When a user A sends an e-mail to a user B, the ISP issues an e-mail address of A@ISP.com to the user A, and stores it in the server. The user A is required to keep an identifier A secret. When A sends an e-mail to the user B, A types B's e-mail address, B@abc.com, in a "To" field on A's mail client software. However, the mail server of the ISP automatically rewrites a "From" field into an LD address of {A, B, N}k@ISP.com, and sends the e-mail.

When the user B sends an e-mail to the user A, B sends the e-mail by using an LD address for A. The server, which received the e-mail, decrypts the LD address by use of K, thus obtaining A's identifier. Then, the server rewrites the "To" field of the e-mail with A@ISP.com. A receives the e-mail, which was sent from B, from the mail server.

When the e-mail address of the user A is leaked, B leaks A's LD address to C and C sends a spam e-mail to A by using the leaked address of A. The ISP decrypts the LD address received from C. Thus, the ISP detects that the spam e-mail is for A and that the LD address was issued to B. Then, the "From" field of the e-mail received from C and the original holder of the LD address extracted from the LD address are compared. If they are different from each other, A is warned that there is a possibility that the original holder (B) leaked the LD address.

This service has an advantage over A that A is not required to directly manage the LD address (such as {A, B, N}k@ISP.com). The server program converts A's address into an LD address, thus concealing the LD address from A. Therefore, A may use an e-mail address having an ordinary identifier in the "To" and "From" fields. In addition, the above works effectively even in a case where the "From" field is fabricated by a person other than B. Since the present invention uses encryption for an address formation rule, forgery is difficult as long as a secret key is not leaked. Moreover, the formation of an LD address and the extraction of a true identifier from the LD address can be performed in a constant time due to the processes of coding and decoding. Furthermore, the amount of memory space required for the processes of coding and decoding is normally as small as to present no problem. Hence, the present invention in which both space complexity and time complexity are constants is greatly suitable for this kind of service.

Sixth Embodiment

Use with Consideration for General User

Figure 7:
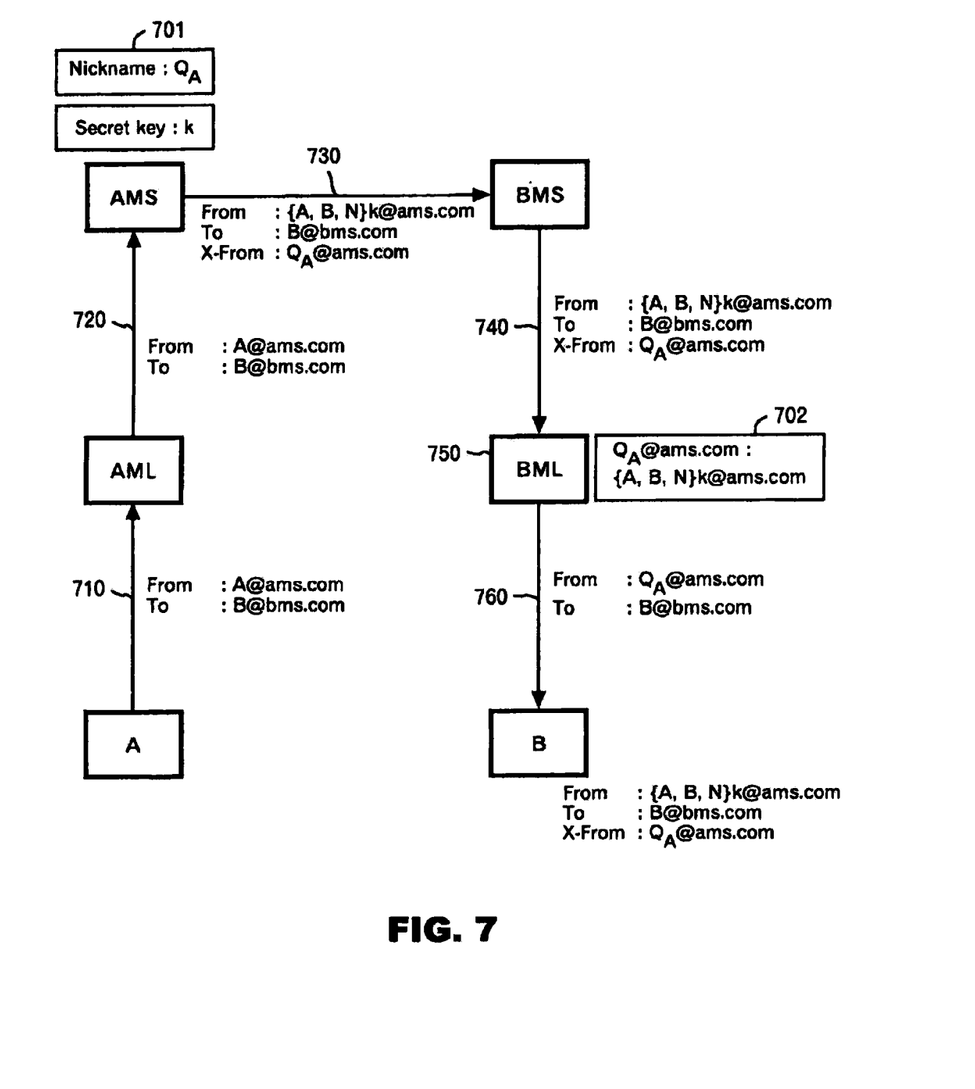
FIG. 7 is a diagram showing an extension protocol in which A issues an e-mail address to B.
Figure 8:
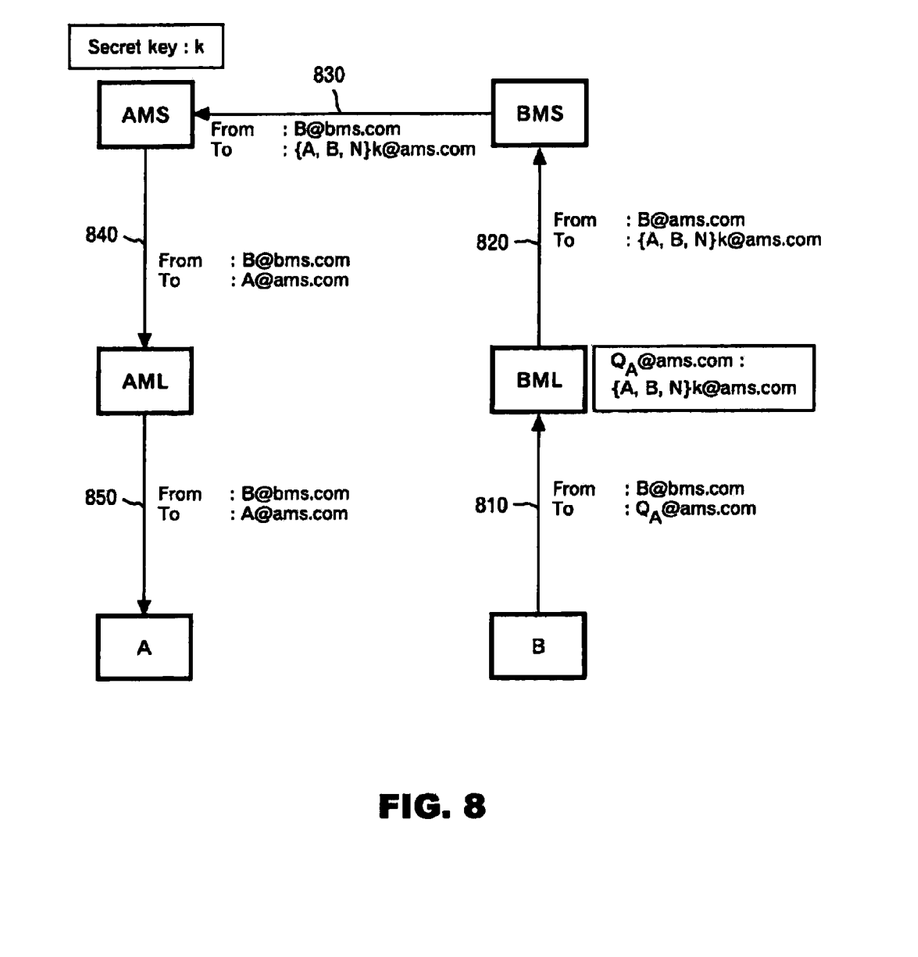
FIG. 8 is a diagram showing an extension protocol in which B sends A an e-mail.
Figure 9:
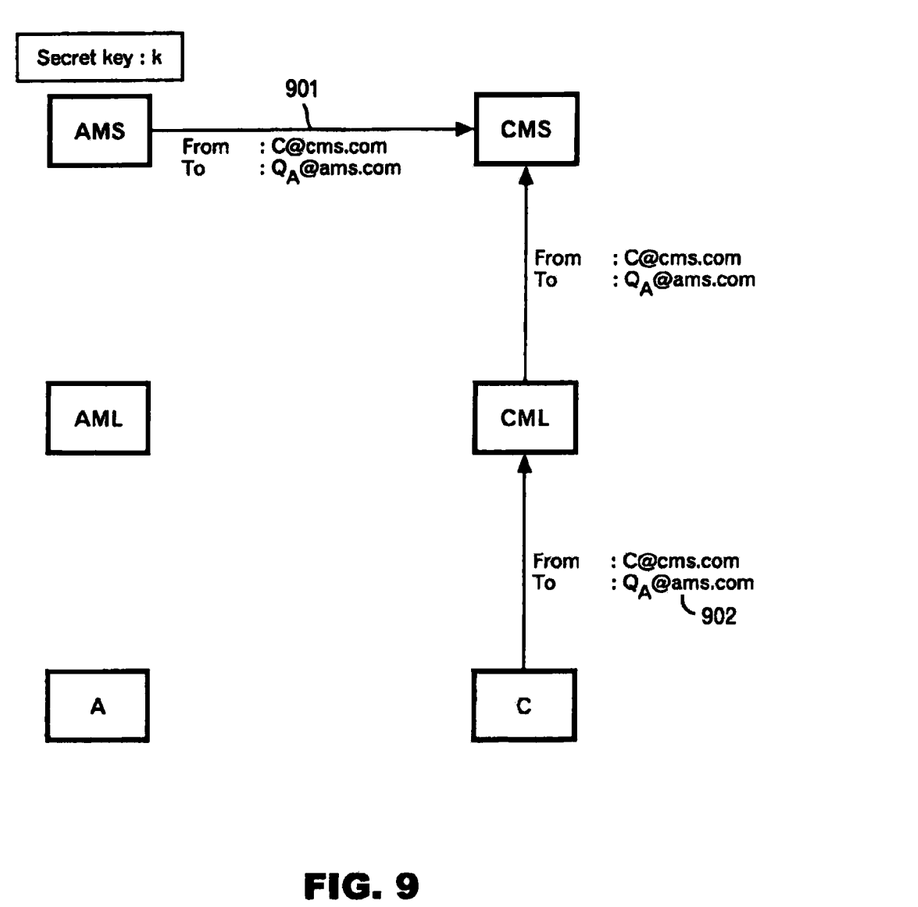
FIG. 9 is a diagram showing a case where B leaks alias to C.

With reference to FIGS. 7 to 9, descriptions will be given of an extension protocol in which a general user is not required to handle an encrypted address. In the use of an LD address, there arises a case where complex, encrypted address is handled upon sending and receiving e-mails. If the method described in the section of the embodiment of the ISP is used, A (a user who is the destination of an LD address) is not required to directly handle the LD address. However, B (a user who sends A an e-mail by using the LD address) maybe required to directly handle a complex-looking, encrypted LD address in some cases. The following is a method of making the appearance of an address similar to that of an ordinary e-mail, the address having an actual LD address inside, in consideration of a general user.

Here, it is set that a user who receives an e-mail (that is, a user who is a destination of an LD address) is A; A's mailer is a receiver's mailer AML; A's mail server is AMS; A's true address issued to A is A@ams.com; a user who sends the e-mail (that is, a user who sends A the e-mail by use of the LD address) is B; B's mailer is BML; B's mail server is BMS; and B's address is B@bms.com. In addition, at this time, A is assumed to know B's e-mail address (B@bms.com) previously in some way (by using the protocol of an LDMS if B is assumed to use the LDMS).

This method eliminates a necessity for B to directly handle an encrypted character string (an LD address) when the address is conveyed to B based on a "From" field in a manner that A sends an e-mail to B. Accordingly, an extension to correspond to the system is added to the mailer BML used by B. On the other hand, other protocols and systems are not required to be changed.

In the current mail system, there are some fields in a header of an e-mail to be sent. A sender's field (a "From:" field) is one of the fields included the header. The address of an e-mail sender (one who wrote an e-mail in the original meaning) is to be entered here. Therefore, at least when an e-mail is sent from AMS, an encrypted address such as {A, B, N}k@ams.com is entered in the "From" field of the e-mail sent by A in the LDMS. If this is sent to B as it is, B is to directly see this complex address (see the ordinary protocols of FIGS. 1 to 5). Therefore, this problem is solved by using a user extension field which exists in an e-mail header of the current mail system. The user extension field is referred to as the "X-From:" field. (In the current mail system, the user extension field begins with X-. In addition, the user extension field can be referred to as X-LDMS From in order to avoid an interference with other user extension fields, but still it is referred to as X-From since X-LDMSFrom is long.) Detailed descriptions will be given of this extension protocol in the following.

Extension Protocol

First, when AMS issues an e-mail account to A, a nickname QA unique to A under AMS, which is an alias of A, is formed other than a real address of A@ams.com (a pet name or a by name may also be formed instead) (701). This QA can be selected by A unless it interferes with the other users under AMS. In other words, this QA is the alias which is set uniquely to A in order not to overlap users under AMS. It guarantees no occurrence of addresses interference with other users under AMS when the contents of "X-From" are registered in BML.

Extension protocol in which A's address is conveyed to B in a manner that A sends an e-mail to B FIG. 7 shows an extension protocol in which A issues an e-mail address to B. A types B's address, B@bms.com, in a "To:" field of AML and sends an e-mail (710). At this time, AML sets A@ams.com in the "From:" field and sends the e-mail to AMS (720). This is a protocol itself for an ordinary mail system. AMS, which received the e-mail, forms an LD address of {A, B, N}k@ams.com and rewrites the "From:" field into the LD address. Furthermore, AMS generates a user extension field of "X-From:", and then A's alias of QA@ams.com is written there. The e-mail completed in this way is sent to BMS (730). This protocol is an original protocol of the present invention. BMS, which received the e-mail, sends the e-mail to B (740). This is the protocol itself for the ordinary mail system. BML (750) receives the sent e-mail. Here, if BML (750) is extended for the LDMS, BML interprets the "X-From:" field and creates a table in which the contents of the "X-From:" field is a key and the contents of the "From:" field (the LD address) is a value (702). Hereinafter, the table created here is referred to as the alias table (the nickname table). The "From:" field of an e-mail header is rewritten into the contents of the "X-From" field (specifically, the alias of QA@ams.com), thus presenting the address to a user (760). Therefore, the user B is not required to directly handle the LD address. When BML (750) is not extended for the LDMS, BML can not interpret the "X-From:" field. Hence, the LD address is presented to the user without being rewritten as the contents of the "From:" field. However, even a mailer which is not extended for an LD address can handle an e-mail having an LD address.

Extension Protocol in which B Sends A an E-Mail

FIG. 8 shows an extension protocol in which B sends A an e-mail. Here, BML is extended for the LDMS, and A's address seems QA@ams.com to B due to the above protocol. In this state, B attempts to send A an e-mail by use of BML. At this time, A's address is assumed to seem QA@ams.com to B. Therefore, Q A@ams.com is entered in a "To:" field in the e-mail edit screen of BML, and B issues a send instruction to BML (810). BML, which received the send instruction, retrieves QA@ams.com from the alias table. Then, its value (that is, the LD address) is overwritten on the "To:" field, and the e-mail is sent to BMS (820). From this point onward, steps are identical with the protocols of the present invention which has heretofore been described.

Exceptional Processes for Extension Protocol

In this extension protocol, the alias of $Q_A$@ams.com is newly added as information which B can know compared with the time when the LDMS is used ordinarily. However, this $Q_A$@ams.com is information which causes no special problem even if it is leaked, since there exists no user corresponding to $Q_A$@ams.com even if an e-mail is sent to $Q_A$@ams.com. In addition, if AMS follows the protocol of the LDMS to decrypt $Q_A$, $Q_A$ is confirmed not to be an LD address since the result of the decoding has no meaning Furthermore, if, for example, a certain rule is provided to generate an alias, AMS interprets the rule and it is made possible to grasp the fact that an e-mail was sent by use of the alias. Therefore, it is possible to determine that this e-mail was not sent by use of a valid method, that is, not by use of an address in the ordinary mail system, or not in accordance with the protocol of the LDMS. Based on the determination, exceptional processes, such as sending an e-mail including a warning or sending an e-mail to an account for an audit, can be performed. FIG. 9 shows a case where B leaks the alias to C and C sends A an e-mail by use of A's address which was notified from B (902). When an e-mail is sent to AMS from a mail server CMS of the third person C, AMS attempts to decrypt the e-mail by use of a key k of $Q_A$, but its result is incomprehensible. Here, since AMS can understand $Q_A$ of the original account part, based on this information, AMS knows that C is not a valid e-mail sender. Hence, it is possible to perform the exceptional processes such as sending an e-mail to the account for the audit or sending A an e-mail including a warning (901). For a case where BML is disassembled to obtain the LD address, BML retains the LD address in the alias table. It is conceivable that the LD address is not leaked to the outside as it can in a manner that BML performs the encryption of the table and the like. In case the information on this table is leaked to the outside, it is equivalent to the case where the LD address is leaked when this extension protocol is not used.

Coexistence with Ordinary E-Mail

When BML receives an ordinary e-mail (in a manner that the method of the present invention is not used), since there is no "X-From:" field in the received e-mail, BML can understand that the e-mail is an ordinary e-mail. In that case, the contents of the "From:" field may or may not be registered in the alias table as both the key and the value. When an e-mail is sent by use of BML, if there is an entry equivalent to the "From:" field, its value is overwritten on the "To:" field. However, if there is no entry equivalent to the "From:" field, the e-mail is sent to BMS while leaving the "To:" field as it is. Moreover, even if the user is an authorized user, it is not possible for the user to send an e-mail by use of $Q_A$@ams.com through a different mailer. In this case, if this different mailer is a mailer which corresponds to the LDMS, it is possible to take measures such as enabling the table to export.

Example of Configuring Hardware

Figure 10:
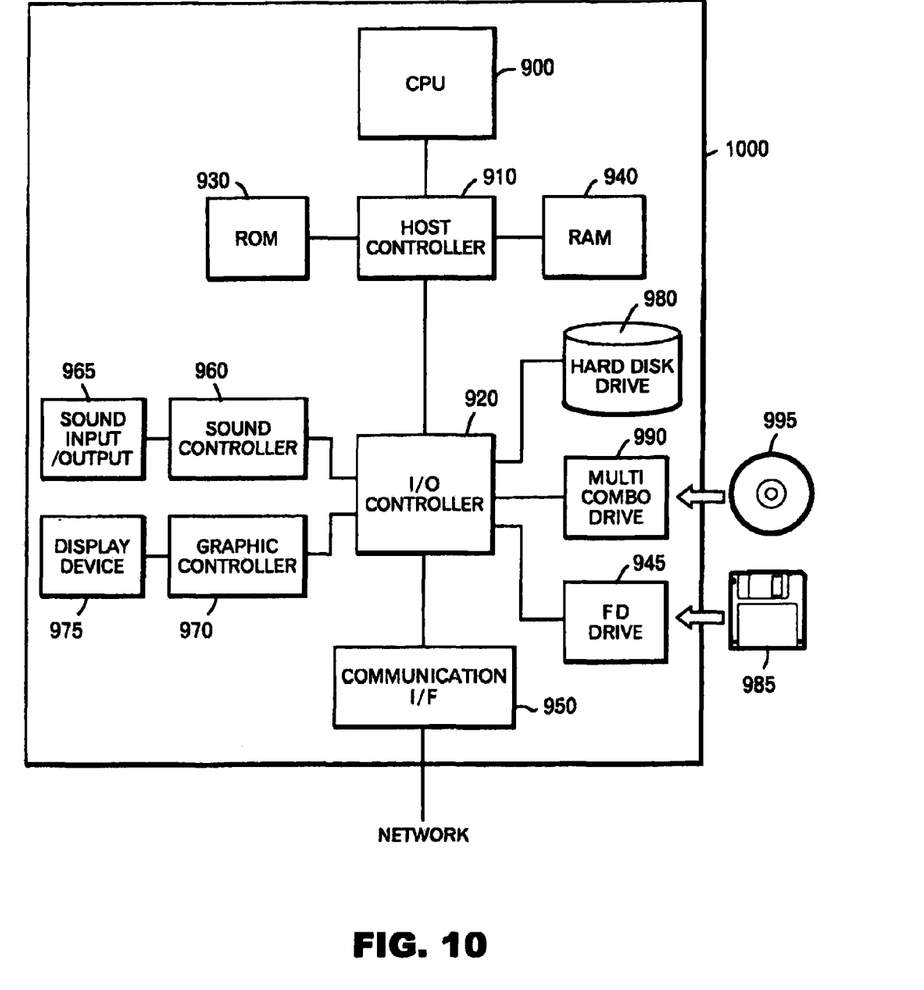
FIG. 10 is a diagram showing an example of a hardware configuration used for the present invention.

FIG. 10 shows an example of a hardware configuration for a mail server and for a terminal used by a user, the hardware configuration relating to the embodiments or the applied embodiments. A computer 1000 includes: CPU peripheral parts having a CPU 900 mutually connected with a host controller 910, a RAM 940, a ROM 930 and an I/O controller 920; a communication interface 950 connected by the I/O controller 920; a hard disk drive 980; a multi combo drive 990 which can read and write a disk-shaped medium 995 such as a CD and a DVD; an FD drive 945 which can read and write a flexible disk 985; a sound controller 960 which drives a sound input/output device 965; a graphic controller 970 which drives a display device 975.

The CPU 900 operates based on programs stored in the ROM 930, BIOS and the RAM 940, and controls each part. The graphic controller 970 obtains image data generated by the CPU 900 and the like on a frame buffer which is provide in the RAM 940, thus displaying the data on the display device 975. Otherwise, the graphic controller 970 may include the frame buffer therein, which stores pictorial data generated by the CPU 900 and the like.

The communication interface 950 communicates with an external mail server, a user terminal, a router and the like via a network. Note that the network can be used without changing the configuration of the present invention even if the network is connected with a wired or wireless connection, infrared rays, or a short-range wireless connection such as BLUETOOTH. The hard disk drive 980 stores code and data of a mailer application, a server program and the like, the code and the data being used by the computer 1000. The multi combo drive 990 reads programs or data off the medium 995 such as a CD and a DVD. The programs or the data, which were read off these storage devices, are loaded to the RAM 940, thus being used by the CPU 900. The medium in which the program of the present invention is stored may be supplied from these external storage media or may be supplied by downloading through the internal hard disk drive 980 or the network.

The program described above may be stored in an external storage medium. As the storage medium, an optical storage medium such as a DVD or a PD, a magneto-optical storage medium such as an MD, a tape medium, a semiconductor memory such as an IC card or the like can be used other than a flexible disk 1090 and a CD-ROM 1095. Furthermore, a program may be captured through the network by using, as a storage device, a hard disk provided in a server system which is connected to a dedicated communication network or the Internet, or a storage device such as a RAM. As understood from the above example of the configuration, hardware necessary for the present invention can use any kind of hardware which has ordinary computer functions. For example, a mobile terminal, a mobile phone terminal, a household electrical appliance having a communication function, hardware dedicated to sending and receiving an e-mail can be used without any trouble.

As described above, the present invention have been described by use of the embodiments. However, a technical scope of the present invention is not limited to the scope described in the above embodiments. It is obvious to those skilled in the art that various alterations or modification can be added to the above embodiments. It is obvious from the description of the scope of claims of the present invention that aspects added with such alterations and modifications can be included in the technical scope of the present invention.

According to the present invention, a communication channel to be used is encrypted in some way, and a third person is precluded from wiretapping in the middle of the communication channel. Therefore, when an e-mail address is leaked, an e-mail address-leaking person B is detectable as long as BMS is reliable. When BMS is not reliable, it is still possible to trace a source of leakage in identifying B as a leaking person, if the third person sends an e-mail using an encrypted LD address including a fresh timestamp. Further, the use of an encrypted LD address makes it possible to block the direct leakage of the LD address from BMS. It is possible, with a timestamp, to distinguish between the leakage of an encrypted LD address (leakage from BMS) and the leakage of an LD address (leakage from B). A user (receiver) has a chance to see the LD address, but it is not necessary to record it. The user (receiver) has no need to know about the LD address, and in a case where an e-mail with the LD address is sent to the user, the user can treat the e-mail as if an ordinary e-mail has been sent. The amount of use of heap in a mail server is allocated only to a secret key used for public key cryptosystem of the mail server and to a secret key of a public key which are to be used for a public-key cipher, and to a secret key for a secret key cipher. Hence a computer resource can be greatly minimized. The time required for converting an LD address and a sender is for a decoding cost for a secret key cipher when BMS is reliable, and is for the sum of decoding costs for the public-key cipher and the secret key cipher, and is scalable, when BMS is not reliable. When an address for the transmission of an LD address is provided, A can select on his/her own judgment whether to make issuing of address to a request for an e-mail address (LD address) made by B. Hence, a symmetric exchange of e-mail addresses, that B also requests A to make communications using an LD address (an address associated with accountability for identifying leakage), becomes possible. The present invention is advantageous over the conventional technology with respect to three aspects such as space complexity, time complexity, and security.

Although the preferred embodiments of the present invention have been described in detail, it should be understood that various changes, substitutions and alternations can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An e-mail sending method, comprising the steps of:
   Concatenating a value {A, B, N}, wherein A is a receiver's identifier, B is a sender's identifier, and N is a nonce issued by a mail server AMS;
   Encrypting, by the mail server AMS the value {A, B, N} with a secret key K, the secret key K being only possessed by the mail server AMS;
   Wherein the receiver's e-mail address (LD address) is formed with a receiver's domain name attached to the encrypted value {A, B, N}K where the sender knows the receiver's e-mail address;
   causing a mail server BMS to receive the e-mail address and a message M from a sender; causing the mail server BMS to send the e-mail address and the message M to the mail server AMS; and causing the mail server AMS to identify a receiver from the e-mail address using a secret key Kin, and to send the message M to the receiver.

2. An e-mail sending method comprising the steps of:

Concatenating a value {A, B, N}, wherein A is a receiver's identifier, B is a sender's identifier, and N is a nonce issued by a mail server AMS;

Encrypting, by the mail server AMS the value {A, B, N} with a secret key K, the secret key K being only possessed by the mail server AMS;

Wherein the receiver's e-mail address (LD address) is formed with a receiver's domain name attached to the encrypted value {A, B, N}K where the sender knows the receiver's e-mail address;

forming an e-mail address with a receiver's domain name attached to a value [[A, B, N]K $K_{AM}$, T]$K_{AMP}$ which is encrypted with a receiver's public key from the encrypted value [A, B, N]K and a timestamp T, and sending a message M; causing the mail server BMS to send a message M to the mail server AMS using the e-mail address;

and causing the mail server AMS to identify a receiver using a public key $K_{AMP}$, a secret key $K_{AM}$, and a secret key $K_{AMs}$ of the mail server AMS and to send a message M to the receiver.

3. The method according to claim 2, when the timestamp T is earlier than a time in which a validity period L is subtracted from a current time, further comprising at least one step taken from a group of steps consisting of:

precluding the message M from being sent to the receiver; or notifying the receiver that the timestamp is old.

4. A mail system comprising a processor configured to perform the steps of:

Concatenating a value {A, B, N}, wherein A is a receiver's identifier, B is a sender's identifier, and N is a nonce issued by a mail server AMS;

Encrypting, by the mail server AMS the value {A, B, N} with a secret key K, the secret key K being only possessed by the mail server AMS;

Wherein the receiver's e-mail address (LD address) is formed with a receiver's domain name attached to the encrypted value {A, B, N}K where the sender knows the receiver's e-mail address;

causing a mail server BMS to receive the e-mail address and a message M from a sender;

causing the mail server BMS to send the e-mail address and the message M to the mail server AMS;

and causing the mail server AMS to identify a receiver from the e-mail address using a secret key $K_{AM}$, and to send the message M to the receiver.

5. A mail system comprising a processor configured to perform the steps of:

Concatenating a value {A, B, N}, wherein A is a receiver's identifier, B is a sender's identifier, and N is a nonce issued by a mail server AMS;

Encrypting, by the mail server AMS the value {A, B, N} with a secret key K, the secret key K being only possessed by the mail server AMS;

Wherein the receiver's e-mail address (LD address) is formed with a receiver's domain name attached to the encrypted value {A, B, N}K where the sender knows the receiver's e-mail address;

forming an e-mail address with a receiver's domain name attached to a value [[A, B, N]K $K_{AM}$, T]$K_{AMP}$ which is encrypted with a receiver's public key from the encrypted value [A, B, N]K and a timestamp T, and sending a message M;

causing the mail server BMS to send a message M to the mail server AMS using the e-mail address; and causing the mail server AMS to identify a receiver using a public key $K_{AMP}$, a secret key $K_{AM}$, and a secret key $K_{AMs}$ of the mail server AMS and to send a message M to the receiver.

6. The system according to claim 5 when the timestamp T is earlier than a time in which a validity period L is subtracted from a current time, further comprising at least one step taken from a group of steps consisting of:

precluding the message M from being sent to the receiver; or notifying the receiver that the timestamp is old.

* * * * *